(12) United States Patent
Wu

(10) Patent No.: US 8,991,580 B2
(45) Date of Patent: Mar. 31, 2015

(54) CLUTCH

(75) Inventor: Wangchang Wu, Hsinchu (TW)

(73) Assignees: Huei Tuan, Hsinchu (TW); Pei-Hsuan Wu, Hsinchu (TW)

( * ) Notice: Subject to any disclaimer, the term of this patent is extended or adjusted under 35 U.S.C. 154(b) by 0 days.

(21) Appl. No.: 13/881,728

(22) PCT Filed: Dec. 15, 2010

(86) PCT No.: PCT/CN2010/002048
§ 371 (c)(1),
(2), (4) Date: Jul. 23, 2013

(87) PCT Pub. No.: WO2012/079196
PCT Pub. Date: Jun. 21, 2012

(65) Prior Publication Data
US 2013/0334005 A1    Dec. 19, 2013

(51) Int. Cl.
*F16D 43/22*    (2006.01)
*F16D 43/18*    (2006.01)
*F16D 43/14*    (2006.01)

(52) U.S. Cl.
CPC .......... *F16D 43/18* (2013.01); *F16D 2043/145* (2013.01); *F16D 43/14* (2013.01)
USPC ... 192/52.5; 192/83; 192/103 B; 192/105 CD

(58) Field of Classification Search
USPC ...................................... 192/52.5
See application file for complete search history.

(56) References Cited

U.S. PATENT DOCUMENTS

| | | | | |
|---|---|---|---|---|
| 3,945,478 A | * | 3/1976 | Kellerman et al. | .... 192/105 CD |
| 5,560,465 A | * | 10/1996 | Zindler | ........ 192/105 BA |
| 2008/0053783 A1 | * | 3/2008 | Lean et al. | ........ 192/105 CD |

FOREIGN PATENT DOCUMENTS

| | | |
|---|---|---|
| EP | 1310695 A1 | 5/2003 |
| TW | I382350 | 2/2000 |
| TW | I447470 | 7/2001 |
| TW | M277835 | 10/2005 |
| TW | I739262 | 11/2012 |
| WO | WO 2010048990 | 5/2010 |

* cited by examiner

*Primary Examiner* — Gene Crawford
*Assistant Examiner* — Mark Manley

(57) ABSTRACT

A clutch is provided with a clutch weight assembly (10), a main driving assembly (20), a plurality of co-rotating elements (30), and a base plate (40). The main driving assembly (20) will be rotated when the power source is activated, and the co-rotating elements (30) are driven synchronously to rotate and then the clutch weight assembly (10) will be driven to rotate synchronously by the co-rotating elements (30). When the speed of the rotation is high enough and the centrifugal force of clutch weight (13) is strong enough to overcome the inward bending strength of the flexible component (14) of the clutch weight assembly (10), then the clutch weight (13) will fly outward to grab the driven part (60) to proceed the slippery engagement.

4 Claims, 10 Drawing Sheets

Comparison of clutch mechanisms

| | weight of clutch weight(m), kg | distance from mass center of clutch weight to center of clutch (r), meter | push element | angle of abutting section |
|---|---|---|---|---|
| clutch of the present invention | 0.085 kg | 0.03 | yes | 40° |
| conventional clutch | 0.085 kg | 0.03 | without | not applicable |

Fig. 12

| Engaging force of centrifugal clutch weight at different engine rev(rpm) | | | | | | | |
|---|---|---|---|---|---|---|---|
| Engine Speed ,(rpm) | 2000 | 3000 | 4000 | 5000 | 6000 | 7000 | Remark |
| Engine Torque ($\tau$), N-m | 19.5 | 16.7 | 15.3 | 15.2 | 15.5 | 15.3 | |
| Centrifugal Force of each clutch weight (fc), (N) | 111 | 251 | 447 | 699 | 1006 | 1370 | Equation (1) |
| Engaging Force of each clutch weight (fc x$\mu$), (N) | 44 | 100 | 178 | 279 | 402 | 548 | Equation (2) |
| Compression Force of push element(fp), N, $\theta=40°$ | 417 | 357 | 327 | 325 | 332 | 327 | Equation (3) |
| Compression Force of push element (fp) N, $\theta=65°$ | 626 | 536 | 491 | 488 | 498 | 491 | Equation (3) |
| Engaging Force of Clutch of Present Invention* (Fi), N ,$\theta=40°$ | --- | 301+fp (658) | 536+fp (863) | 838+fp (1163) | 1207+fp (1539) | 1644+fp (1971) | Equation (5) |
| Engaging Force of Clutch of Present Invention* (Fi), N, $\theta=65°$ | --- | 301+fp (837) | 536+fp (1027) | 838+fp (1326) | 1207+fp (1705) | 1644+fp (2135) | Equation (5) |
| Engaging Force(Fs) of Conventional Clutch **, N | --- | 301 | 536 | 838 | 1207 | 1644 | Equation (4) |

\* Embodiment of Present Invention—Assumed that weight of each clutch weight (13) is in 0.085 Kg (as shown in Figs. 5,6 and 7), and angle of abuting section( $\theta$ ) is in 40° (as shown in Figs. 7 and 8)

\*\* Conventional Clutch (Prior Art):—Assumed that weight of individual clutch weight in integral clutch block (1) also is in 0.085 Kg (as shown in Figs. 10 and 11)

The engaging force of clutch/clutch weight is calculated as follows:

Centrifugal Force (fc) of each clutch weight, N = $(2*Pi*RPM/60)^2 * m (Kg) * r (meter)$ ————————Equation (1)

Engaging Force (fc x$\mu$) of each clutch weight, N = Centrifugal Force of each clutch weight( fc )x Friction Coefficient of wear pad( $\mu$)

$\qquad = (2*Pi*RPM/60)^2 * m (Kg) * r (meter) \times \mu$ ————Equation (2)

Compression Force of push element (fp), N = Engine Torque ($\tau$) (N-m) / d(meter) x Cos (90-$\theta$) ————————Equation (3)

Engaging Force of Conventional Clutch (Fs)= Engaging Force of each clutch weight ( fc x$\mu$ ) x 3 clutch weights $\qquad =(2*Pi*RPM/60)^2 * m (Kg) * r (meter) \times \mu \times 3$ ————Equation (4)

Engaging Force of Clutch of Preferred Embodiment of Present Invention (Fi)

=(Centrifugal Force of each clutch weight( fc) x Friction Coefficient of wear pad( $\mu$) x 3 clutch weights + Compression Force (fp), that is produced by the compression of push element against to the abuting section of clutch weight = Engaging force of Conventional Clutch (Fs) + Compression Force of push element (fp)———————————— Equation (5)

where, r (radius) in meter represents the distance from the center of mass of clutch weight to the center of clutch, and r = 0.03meter (3cm)

m (weight) in kg represents the weight of clutch weight, and m=0.085kg (85gram)

RPM represents the rotational speed of clutch (or the engine) = 2000-9000

$\mu$ represents the friction coefficient of wear pad, and $\mu$ = 0.40 d in meter represents the distance from the compressed portion of push element to the center of clutch, and d= 0.03meter

Fig. 13

Timing/rev of solid engagement vs transformable strength of corotating element

| | | | rev of engagement, (rpm) | |
|---|---|---|---|---|
| | push element | transformable strength of corotating element, (kg) | slippery engagement (initial engaging) | solid engagement (fully engagement) |
| clutch of the present Invention | yes | 3 | 4500 | 5000 |
| clutch of the present Invention | yes | 6 | 4500 | 5500 |
| clutch of the present Invention | yes | 11 | 4500 | 6500 |
| conventional clutch | without | not applicable | 4500 | 7000 |

* clutch of the present invention--- weight of clutch weight in 0.085 kg ,angle of abuting section in 40° (as shown in Figs. 5, 6 ,7and 8).
** conventional clutch ———— weight of clutch weight in 0.085 kg (as shown in Figs. 10 and 11 ).

CLUTCH

BACKGROUND OF THE INVENTION

1. Field of the Invention

The present invention relates to a clutch that could enhance the performance of the clutch, and more particularly to one that could strengthen the engaging force of each clutch weight to make the power transmission of the clutch more smooth and more stable.

2. Description of the Prior Art

A clutch has been widely used in the automatic transmission mechanism of a vehicle. The function of clutch is to transmit the engine power, clutch weights are pivotally installed on a base plate. When the rotation speed of base plate is increased, the clutch weights will fly outward to grasp the driven member and the power is transmitted to the driven shaft to drive the vehicle; when the rotation speed of base plate is decreased, the clutch weights will move inward then the transmission of power is terminated; In which, both ends of each clutch weight are connected with the tension spring (return element). The timing of opening or closing of clutch weights is determined by the tension strength of the tension springs.

Theoretically, if the tension strength of each tension spring (return element) is identical as required then the movement (i.e., opening/closing) of each clutch weight should be synchronous. But in reality, the throttle is variable all the time so the rotation speed of base plate is not in a constant revolution thus the centrifugal force of each clutch weight will be different due to the revolution of each clutch weight is dissimilar. Then transmission efficiency of clutch becomes unstable and inefficient.

There are many patents which disclose the adjustment and setting of the tension strength of the tension springs, such as European Patent No. EP 1310695 A1, Taiwan Patent Publication No. 382350 titled "Motorcycle Clutch Structure", Taiwan Patent Publication No. 739262 titled "Motorcycle Automatic Gearshift Clutch", Taiwan Patent Publication No. 447470 titled "Motorcycle Clutch Structure", Taiwan Utility Model Registration No. M277835 titled "Motorcycle Clutch Structure". Basically the technical means of these patents are to change the connecting distance of the tension spring between two clutch weights to adjust the tension force of the tension spring. However, these structures of the aforesaid patents still have the problems that the engaging force is weak and the engagement of the clutch weight is unstable. As shown in FIG. 10 and FIG. 11, PCT Publication No. WO 2010048990 discloses a clutch which comprises a plurality of clutch weight area integrally formed into clutch block 1. Through the flexibility of material used for clutch block 1 and the special designing of clutch weight area in the clutch block 1, thus the flexibility of clutch weight area is inherent without any return element, However, the engaging force is still too weak (clutch slippage is serious), so the transmission efficiency of clutch block 1 is still unstable.

SUMMARY OF THE INVENTION

The primary object of the present invention is to provide a high performance clutch in which the opening and closing of each integrated clutch weight can make the main driving assembly to receive the torque from an engine power and the push element on the main driving assembly will compress the abutting section of each clutch weight to enhance the engaging force of each clutch weight and providing an anti-reversal function to reduce the vibration, so that the smoothness and stability of the power transmission could be provided.

In order to achieve the aforesaid object, the present invention provides a clutch, comprising a clutch weight assembly, a main driving assembly, a plurality of co-rotating elements, and a base plate. The clutch weight assembly comprises a plurality of supporting section and connecting section is used to connect every two adjacent supporting sections to become integrated and one clutch weight is formed at outer portion of every supporting section, at one end of every clutch weight, there is a flexible component which is integrally formed with the support block, a storage space is formed between the clutch weight and the connection section; an abutting section is formed at the inner side, in the storage space, of clutch weight. The main driving assembly is installed in the central portion of clutch weight assembly and is rotatable, an axle mounting bore, used for the power source, is formed in the central portion of main driving assembly and at the outer circumference of axle mounting bore, a push element is individually formed and extending into every corresponding storage space, one side of each push element is provided with a resting section for stopping via resting against the supporting section; and at one front end of each push element is formed with an urging head to press the abutting section at the inner side of each clutch weight and a rotative sliding section is formed, beside the resting section, to hold and keep the main driving assembly, when rotating, in restricted position; a plurality of co-rotating elements being individually mounted in the every storage space of clutch weight assembly, one end of said co-rotating element is supported by the supporting section and another opposing end is held against the push element of the main driving assembly. The base plate is mounted on the supporting section of the clutch weight assembly to keep the main driving assembly in the central portion of clutch weight assembly and also to prevent the co-rotating element loosing out from the storage space; when the power source is activated, the main driving assembly will be rotated and the co-rotating elements will be driven synchronously to rotate and then the clutch weight assembly will be driven to rotate synchronously by the co-rotating elements; when the speed of the rotation is high enough and the centrifugal force of clutch weight is strong enough to overcome the inward bending strength of the flexible component of clutch weight assembly, then the clutch weight will fly outward to grab the driven part to proceed a slippery engagement and when the friction resistance between the wear pad of clutch weight and the driven part is greater than the predetermined transformable strength of co-rotating element, the co-rotating element will be compressed and deformed by push element, then the rotation speed of the main driving assembly and clutch weight assembly becomes no more synchronously and main driving assembly will move further forward and the engine power will be transmitted to make the push element to compress the abutting section of clutch weight through the urging head of push element to generate a press action, so that the engagement between the wear pad of the clutch weight and the driven part becomes tight (solid engaged) and the power is transmitted to the driven part. Through the enforcement of engagement between the wear pad of clutch weight and the driven part, power transmission becomes smooth and stable. Moreover due to the slippage between the wear pad and driven part is much less so the friction temperature is lower and the durability of wear pad is longer.

Wherein, a plurality of co-rotating elements is individually installed in every correspondent storage space of clutch weight assembly. One end of said co-rotating element is supported by the supporting section and another opposing end is held against the push element of the main driving assembly, the co-rotating element is one kind of compression spring and the co-rotating element will be deformed when compressed by the push element under a predetermined stress. The timing (revolution) of when the push element of main driving assembly will compress the abutting section of clutch weight can be easily adjusted by using co-rotating elements with different transformable strength.

Wherein, one end of clutch weight of clutch weight assembly is connected to the support block via flexible component. A hollow portion is formed at flexible component which located between the support block and the curved clutch weight. The hollow portion is used to reduce the stress of the flexible component, so the clutch weight is more flexible to be open or to be closed.

Wherein, the base plate is coupled on the supporting section of clutch weight assembly, there is a fixing hole on the support section, for every fixing hole there will be a corresponding pierced hole on the base plate, the base plate is secured on the supporting section through the bolts to prevent the loosing of main driving assembly and co-rotating element from the restricted position.

BRIEF DESCRIPTION OF THE DRAWINGS

FIG. 12 is a table showing a comparison between a clutch, according to the present invention and the conventional clutch;

FIG. 13 is a table showing an analysis of the engaging force of clutch; and

FIG. 14 is a table showing a test report about the timing of clutch engagement.

DETAILED DESCRIPTION OF THE PREFERRED EMBODIMENTS

Figure 5:
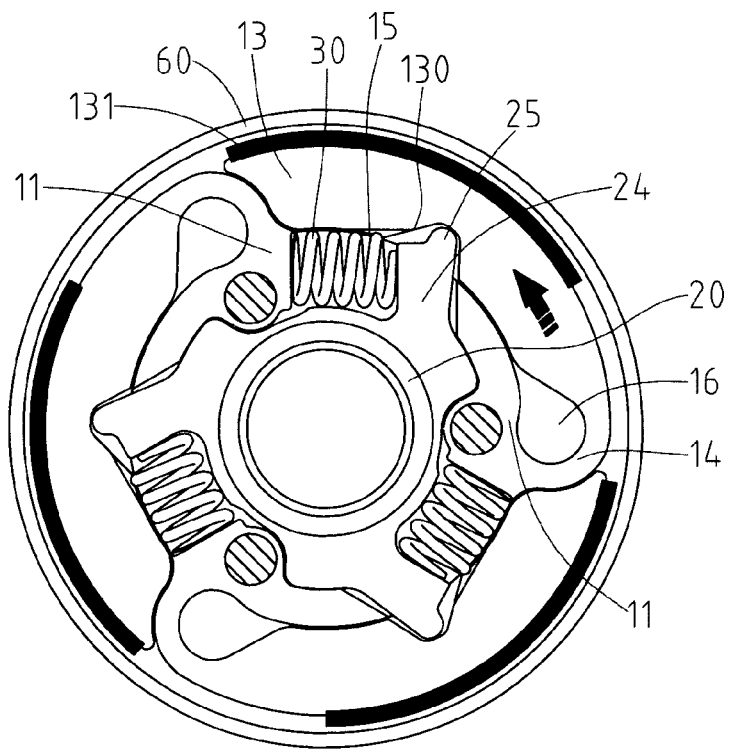
FIG. 5 is a schematic view of a preferred embodiment according to the present invention, showing the clutch weights are not in engaging.
Figure 6:
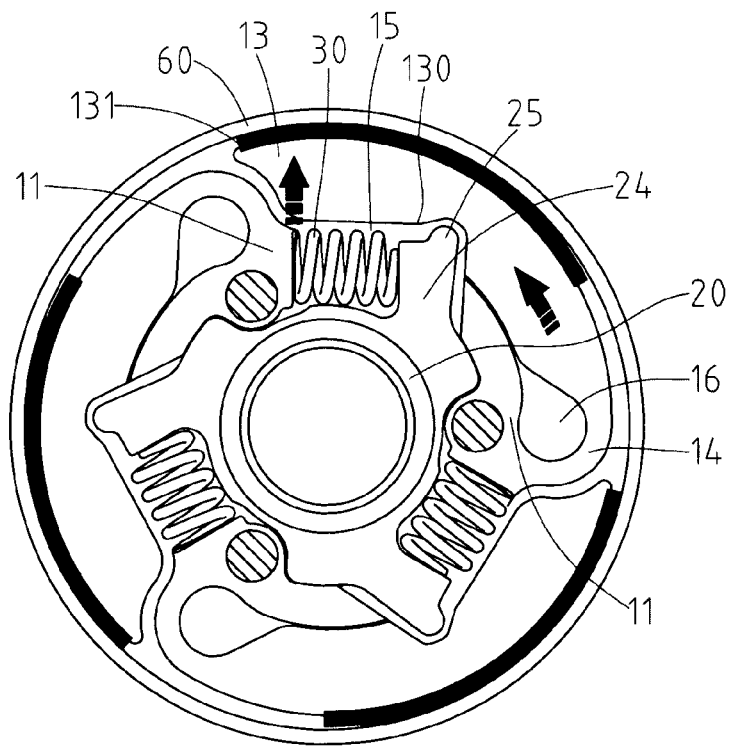
FIG. 6 is a schematic view of a preferred embodiment according to the present invention, showing that clutch weights are engaging but the push elements is not activated.
Figure 7:
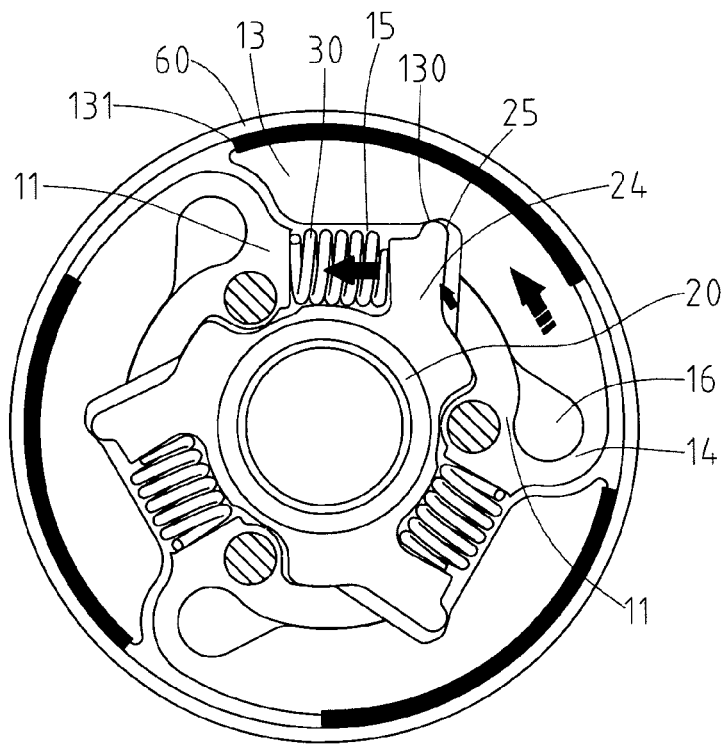
FIG. 7 is a schematic view of a preferred embodiment according to the present invention, showing that clutch weights are engaged and the push elements are activated to proceed the enforcing function.
Figure 8:
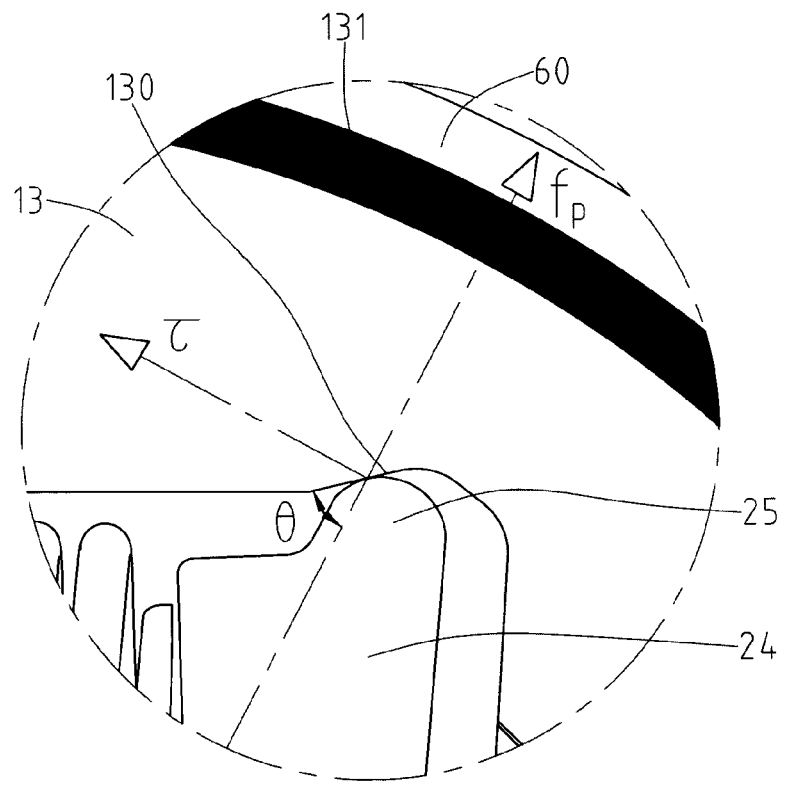
FIG. 8 is a schematic view of a preferred embodiment according to the present invention, showing that the press action of push element on the abutting section of clutch weight.

Referring to FIGS. 1 to 14, a clutch comprises a clutch weight assembly 10, a main driving assembly 20, a plurality of co-rotating elements 30, and a base plate 40. The clutch weight assembly 10 comprises a plurality of supporting section 11 and a connecting section 12 is used to connect every two adjacent supporting sections 11 integrally, and a clutch weight 13 in curved shape is formed at outer portion of every supporting section 11, one end of the clutch weight 13 is connected integrally to the support block 11 through a flexible component 14, a storage space 15 is formed between the clutch weight 13 and the connection portion 12. An abutting section 130 is formed at the inner side, located at storage space 15, of every clutch weight 13. The main driving assembly 20 is installed in the center of the clutch weight assembly 10 and is rotatable and in the center of main driving assembly 20 there is one axle mounting bore 21 used to connect to a power source and at the outer circumference of axle mounting bore 21, a push element 24 is individually formed and extending into every corresponding storage space 15, and one side of each push element 24 is provided with a resting section 23 for stopping via resting against the supporting section 11 and one front end of each push element 24 is formed with an urging head 25 to press the abutting section 130 at the inner side of each clutch weight 13 and a rotative sliding section 22 is formed, beside the resting section 23, to hold and keep the main driving assembly 20, when rotating, in restricted position. A plurality of co-rotating elements 30 are individually mounted in the every storage space 15 of clutch weight assembly 10. One end of said co-rotating element 30 is supported by the supporting section 11 and another opposing end is held against the push element 24 of the main driving assembly 20. The base plate 40 is mounted on the supporting section 11 of the clutch weight assembly 10 to keep the main driving assembly 20 in the central portion of clutch weight assembly 10 and to prevent the co-rotating element 30 loosing out from the storage space 15. As shown in FIG. 5, when the power source 50 (shaft) is activated, the main driving assembly 20 will be driven to rotate and at the same time the co-rotating elements 30 is driven synchronously to rotate and then the clutch weight assembly 10 will be driven to rotate synchronously by the co-rotating elements 30. As shown in FIG. 6, when the speed of the rotation is high enough and the centrifugal force of clutch weight 13 is strong enough to overcome the inward bending strength of the flexible component 14 of clutch weight assembly 10, then the clutch weight 13 will fly outward to grab the driven part 60 to proceed the slippery engagement; and when the friction resistance between the wear pad 131 of clutch weight 13 and the driven part 60 is greater than the predetermined transformable strength of the co-rotating element 30, the co-rotating element 30 will be compressed and deformed as shown in FIGS. 7-8 then the rotation speed of the main driving assembly 20 and clutch weight assembly 10 becomes no more synchronously and main driving assembly 20 will move further forward, and the engine power will be transmitted to make the push element 24 to compress the abutting section 130 of clutch weight 13 through the urging head 25 of push element 24 to generate a press action, so that the engagement between the wear pad 131 of the clutch weight 13 and the driven part 60 becomes tight (solid engaged) and the power is transmitted to the driven part 60. Through the enforcement of engagement between the wear pad 131 of clutch weight 13 and the driven part 60, the power transmission becomes smooth and stable. Moreover due to the slippage between the wear pad 131 and driven part 60 is much less, the friction temperature is lower and the durability of wear pad 131 is longer.

According to the embodiment, wherein as shown in FIGS. 1, 3, 5, 6, 7, and 8, a plurality of co-rotating elements 30 are individually installed in every correspondent storage space 15 of clutch weight assembly 10, one end of said co-rotating element 30 is supported by the supporting section 11 and another opposing end is held against the push element 24 of the main driving assembly 20 and the co-rotating element 30 is one kind of compression spring, and the co-rotating element 30 will be deformed when compressed by the push element 24 under a predetermined stress. The timing (revolution) of when the push element 24 of main driving assembly will compress the abutting section 130 of clutch weight 13 can be easily adjusted by using co-rotating elements 30 with different transformable strength; which means it is easy to control the timing (revolution) of slippery engaging or solid engaged by using co-rotating elements 30 with different transformable strength to get different riding performance such as smooth or powerful acceleration.

According to the embodiment, wherein as shown in FIGS. 1, 2, 5, 6, 7, and 8, one end of clutch weight 13 of clutch weight assembly 10 is connected to the support block 11 via flexible component 14. A hollow portion 16 is formed at flexible component 14 which located between the support block 11 and the curved clutch weight 13. The hollow portion 16 is used to reduce the stress of the flexible component 14, so the clutch weight 13 is more flexible to open or to close.

Figure 1:
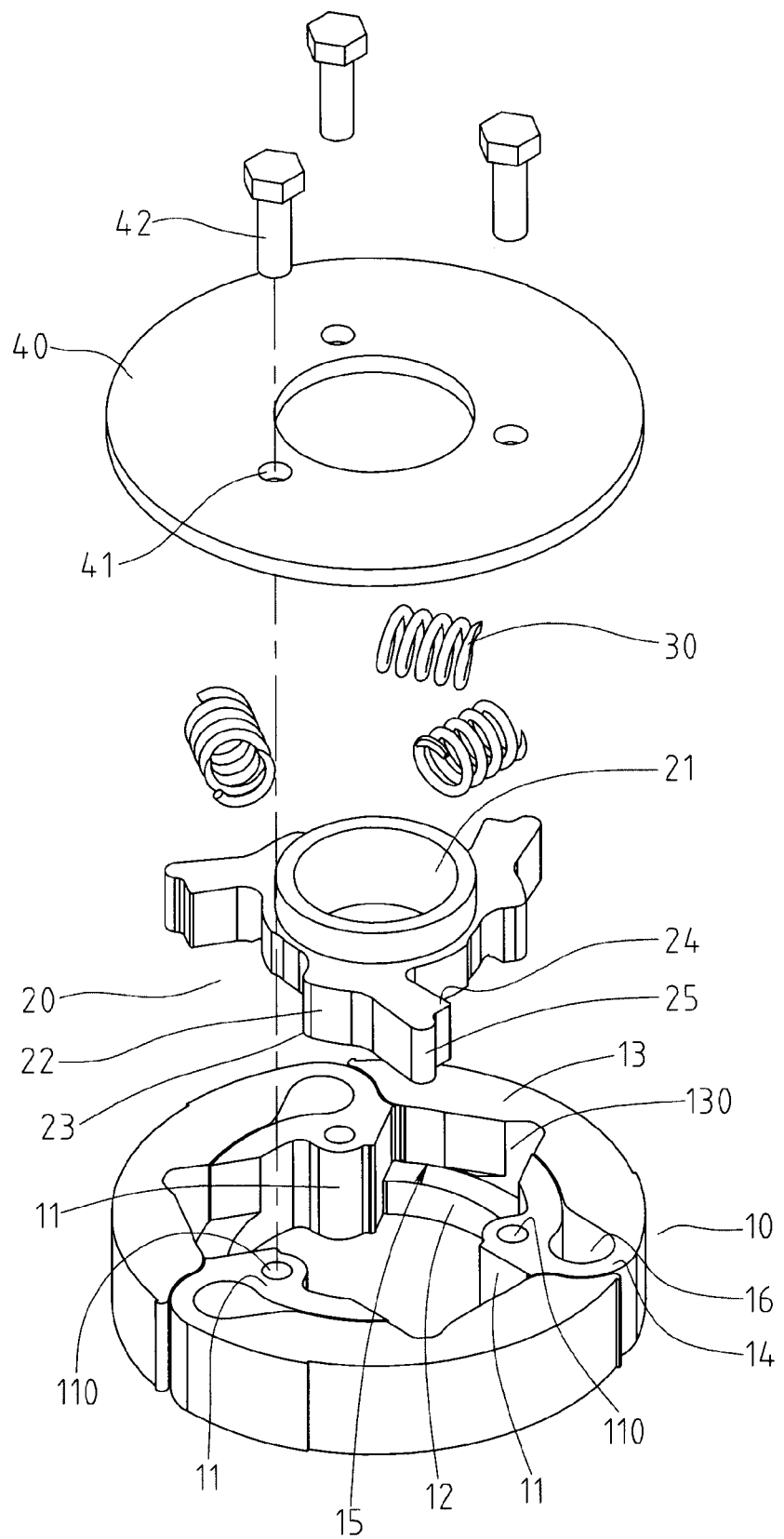
FIG. 1 is an exploded view of a preferred embodiment according to the present invention.
Figure 2:
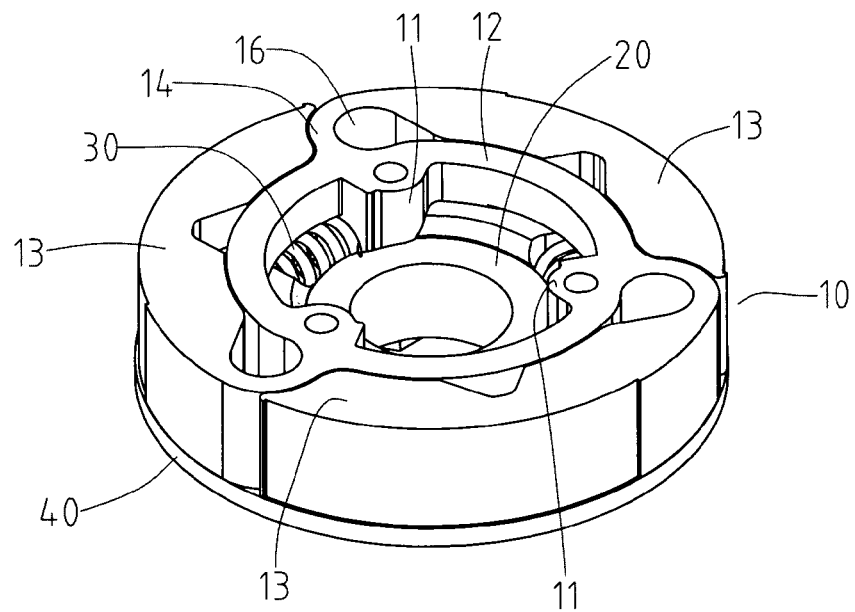
FIG. 2 is a perspective view of a preferred embodiment according to the present invention.
Figure 3:
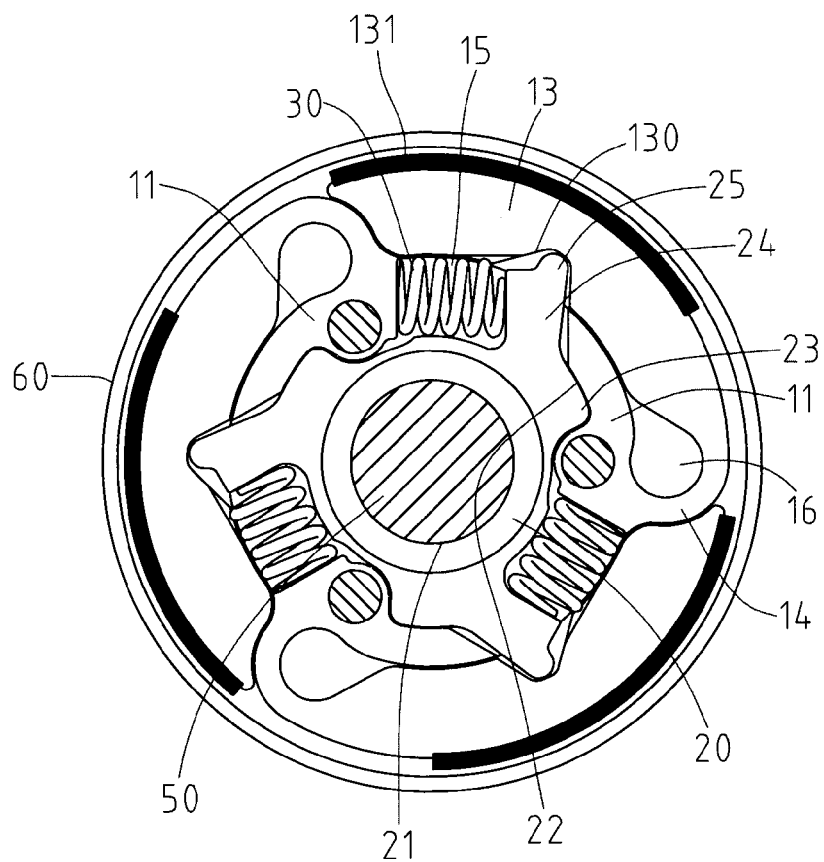
FIG. 3 is a cross-sectional view of a preferred embodiment according to the present invention.
Figure 4:
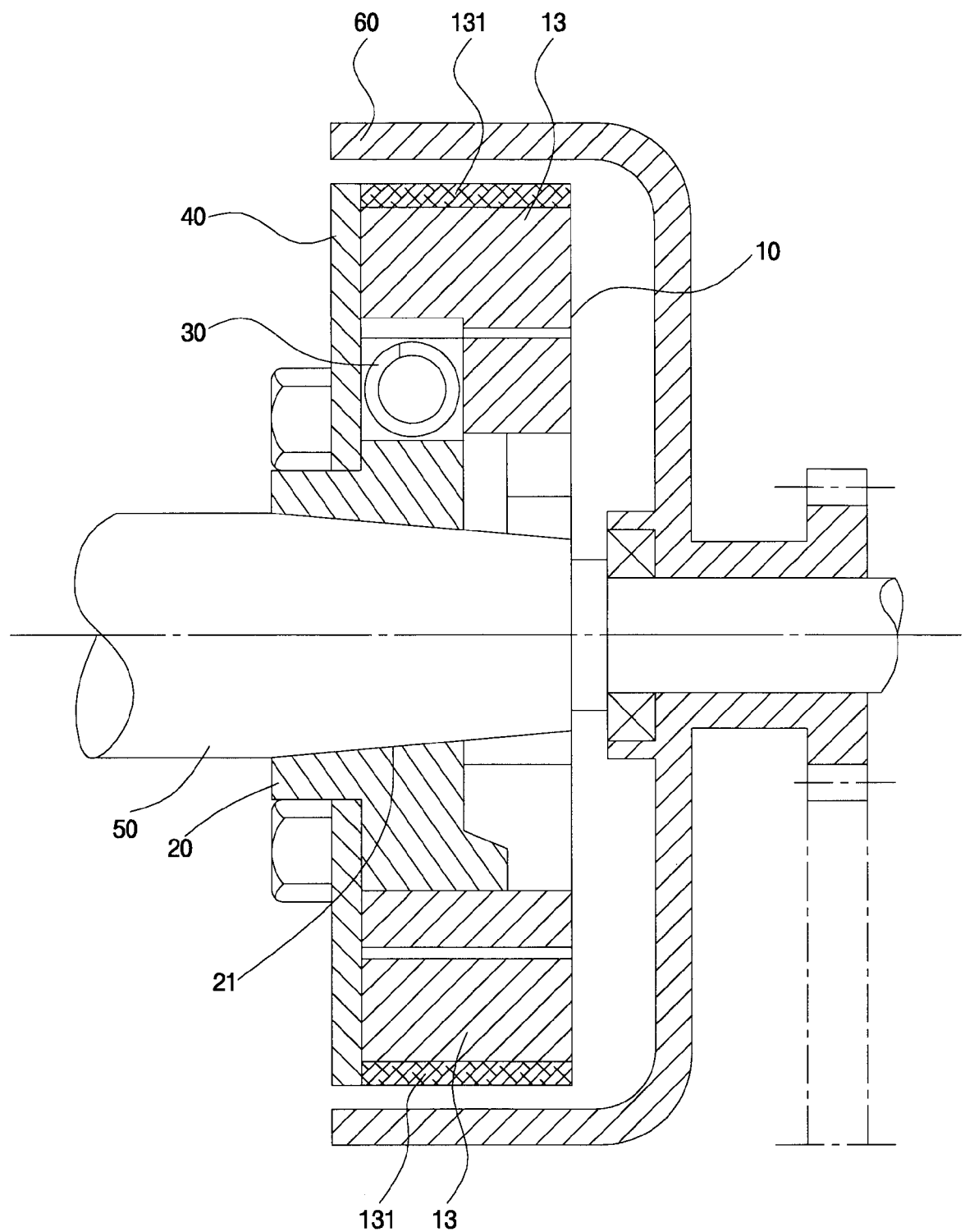
FIG. 4 is a side cross-sectional view of a preferred according to the present invention.
Figure 9:
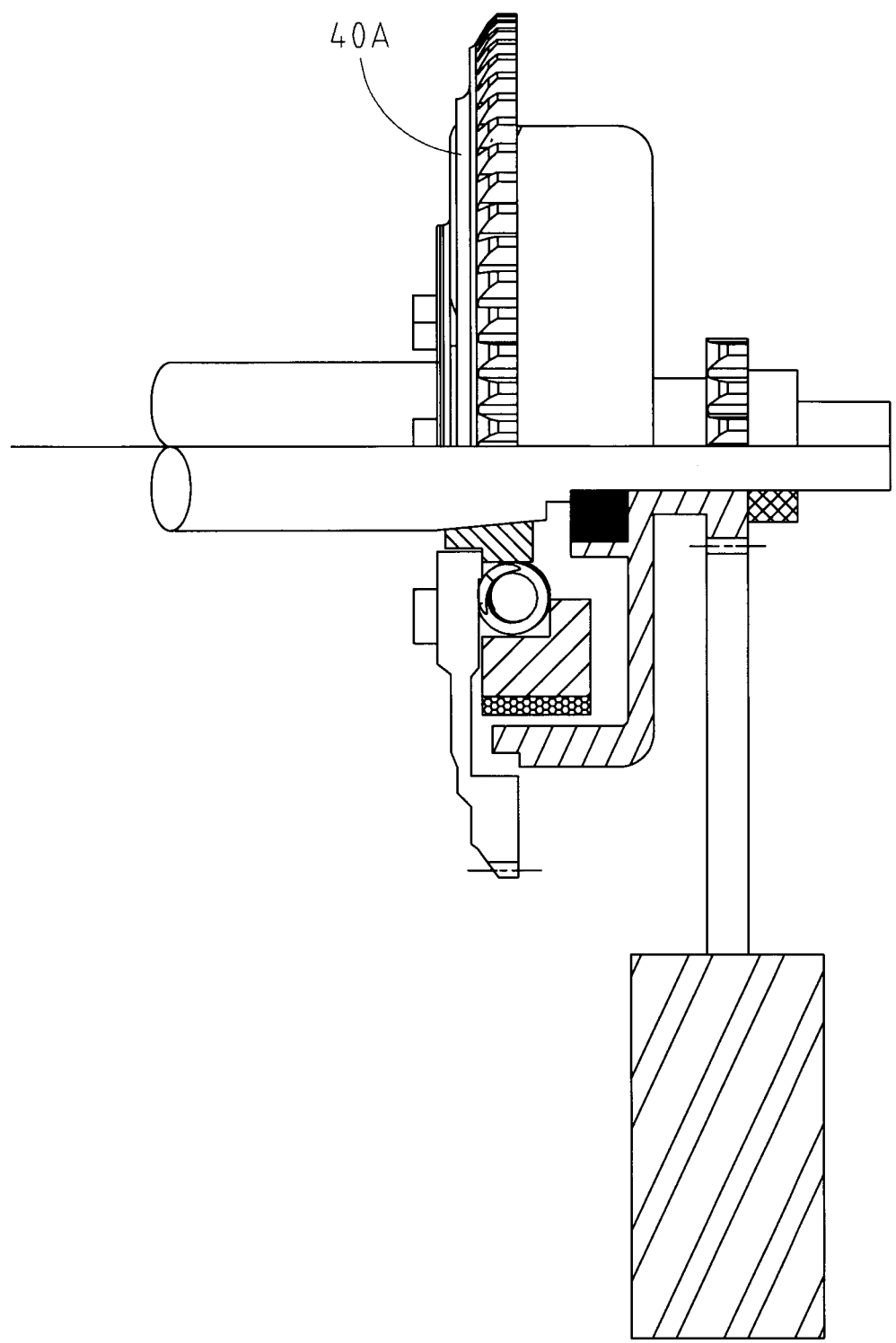
FIG. 9 is a schematic view of a preferred embodiment according to the present invention showing another kind of base plate.

According to the embodiment, wherein as shown in FIG. 1, the base plate 40 is coupled on the supporting section 11 of clutch weight assembly 10, there is a fixing hole 110 on the support section 11 and for every fixing hole 110 there is a corresponding pierced hole 41 on the base plate 40, the base plate 40 is secured on the supporting section 11 through the bolts to prevent the loosing of main driving assembly 20 and co-rotating element 30 from the position. Besides, the base plate 40 can be in any shape such as gear type base plate 40A suitable for other transmission, as shown in FIG. 9.

According to the embodiment, the innovation of present invention is proven by the test data about the relationship between the solid engagement and transformation strength of co-rotating element.

Figure 10:
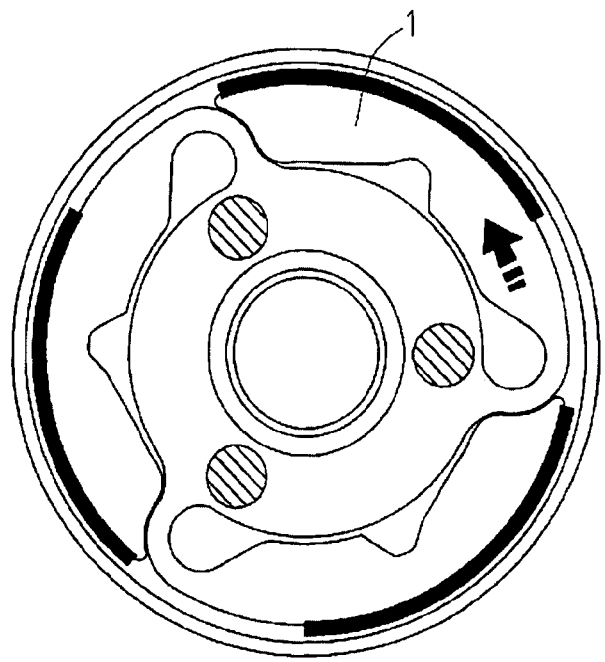
FIG. 10 is a schematic view of a conventional clutch, showing the clutch weights are not in engaging.
Figure 11:
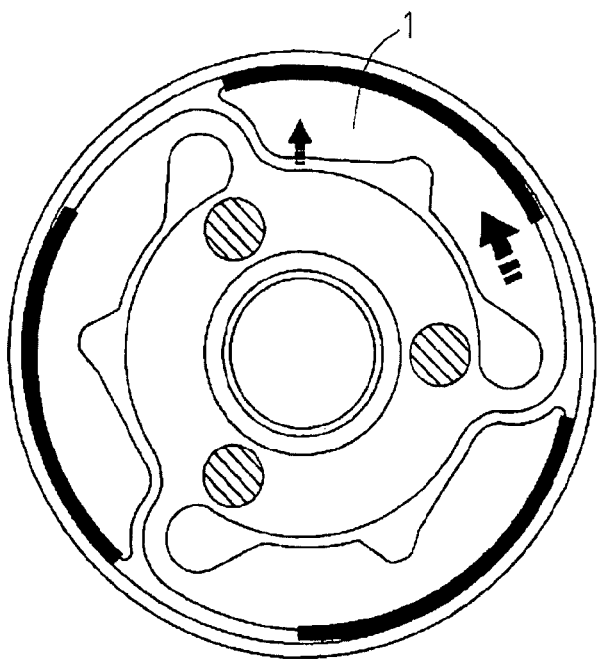
FIG. 11 is a schematic view of a conventional clutch, showing the clutch weights being engaged.

FIG. 12 is a table showing the comparison of structures and parameters between the clutch according to the embodiment of present invention and a conventional clutch as shown in FIGS. 10 and 11. Note: Basic parameter such as weight in both clutch weights is deigned to be the same.

FIG. 13 is a table showing an analysis about the engaging force of centrifugal clutch weight at different engine revolution (rpm) for clutch of present invention and conventional clutch.

FIG. 14 is a table showing a test result about the data of timing/revolution of when solid engagement happened versus the transformable strength of co-rotating element.

Through FIG. 12 test condition of clutch, FIG. 13 analysis of engaging force and FIG. 14 test result, it is testified that the driven part (clutch bell) can be solid engaged to rotate at lower revolution by the clutch of the present invention, and due to clutch slippage becomes much less, the friction heat of clutch weight is lowered and the durability of wear pad becomes much longer. The test result also proves that the timing (revolution) of when solid engagement happened can be adjusted by the transformable strength of co-rotating element and with/without the co-rotating element. Moreover, through the test result, it is known the engaging force of conventional clutch (i.e., centrifugal force of clutch weight) is low at low engine revolution so higher revolution is needed to get enough engaging force to engage the driven part (clutch bell) completely and since the clutch slippage is serious and the friction heat of wear pad of clutch weight will be high and the fade of wear pad is very quick. The clutch of present invention can overcome all the shortcomings existed in the conventional clutches and provide much improvement in efficiency of clutch transmission and riding performance of CVT vehicles.

The above descriptions are just the better examples of the embodiment of this invention. Any simplified, equivalent modification or changes based on the above stated embodiments are covered by the art of this invention.

What is claimed is:

1. A clutch, comprising a clutch weight assembly, a main driving assembly, a plurality of corotating elements, and a base plate; the clutch weight assembly comprising a plurality of supporting sections and a connecting section being used to connect every two adjacent supporting sections to become integrated and one clutch weight being formed at an outer portion of every supporting section, one end of every clutch weight, being provided with a flexible component which is integratedly formed with the supporting section, a storage space being formed between the clutch weight and the said connection section; an abutting section is formed at an inner side, in the storage space, of clutch weight; the main driving assembly is installed in the central portion of clutch weight assembly and is rotatable, an axle mounting bore, used for a power source, is formed in the central portion of main driving assembly; and at an outer circumference of axle mounting bore, a push element is individually formed and extending into every corresponding storage space; one side of each push element is provided with a resting section for stopping via resting against the supporting section; and one front end of each push element is formed with an urging head to press the abutting section at the inner side of each clutch weight and a rotative sliding section is formed, beside the resting section, to hold and keep the main driving assembly, when rotating, in restricted position; a plurality of corotating elements being individually mounted in the every storage space of clutch weight assembly; one end of said corotating element is supported by the supporting section and another opposing end is held against the push element of the main driving assembly; the base plate is mounted on the supporting section of the clutch weight assembly to keep the main driving assembly in the central portion of clutch weight assembly and also to prevent the corotating element loosing out from the storage space; when the power source is activated, the main driving assembly will be rotated and the corotating elements will be driven synchronously to rotate and then the clutch weight assembly will be driven to rotate synchronously by the corotating elements; when the speed of the rotation is high enough and the centrifugal force of clutch weight is strong enough to overcome the inward bending strength of the flexible component of clutch weight assembly, then the clutch weight will fly outward to grab the driven part to proceed a slippery engagement and when the friction resistance between the wear pad of clutch weight and the driven part is greater than the predetermined transformable strength of corotating element, the corotating element will be compressed and deformed by push element, then the rotation speed of the main driving assembly and clutch weight assembly are not synchronous and main driving assembly will move further forward and the engine power will be transmitted to make the push element to compress the abutting section of clutch weight through the urging head of push element to generate a press action, so that the engagement between the wear pad of the clutch weight and the driven part becomes tight and the power is transmitted to the driven part.

2. A clutch according to the claim 1, wherein the corotating element is one kind of compression spring.

3. A clutch according to the claim 1, a hollow portion is formed at a flexible component which is located between a support block and a curved clutch weight.

4. A clutch according to the claim 1, wherein on each supporting section there is a fixing hole, and corresponding to the fixing hole, a pierced hole is installed at the base plate.

\* \* \* \* \*